(12) United States Patent
Egor (10) Patent No.: US 10,901,303 B2
(45) Date of Patent: Jan. 26, 2021

(54) TRACK SYSTEM (71) Applicant: Denisov Egor, Moscow (RU)

(72) Inventor: Denisov Egor, Moscow (RU)

(*) Notice: Subject to any disclaimer, the term of this patent is extended or adjusted under 35 U.S.C. 154(b) by 0 days.

(21) Appl. No.: 16/380,939

(22) Filed: Apr. 10, 2019

(65) Prior Publication Data

US 2019/0317384 A1 Oct. 17, 2019

(30) Foreign Application Priority Data

Apr. 11, 2018 (CN) .......................... 2018 2 0509042

(51) Int. Cl.
*G03B 17/56* (2006.01)
*F16M 13/02* (2006.01)
*F16M 11/04* (2006.01)

(52) U.S. Cl.
CPC ......... *G03B 17/561* (2013.01); *F16M 11/043* (2013.01); *F16M 13/022* (2013.01)

(58) Field of Classification Search
CPC ... F16M 11/043; F16M 13/022; G03B 17/561
See application file for complete search history.

(56) References Cited

U.S. PATENT DOCUMENTS

| 2,633,319 A | * | 3/1953 | Musial | F16M 11/16 |
| | | | | 248/168 |
| 5,752,112 A | * | 5/1998 | Paddock | F16M 13/04 |
| | | | | 352/243 |
| 8,721,199 B1 | * | 5/2014 | Hart | F16M 11/425 |
| | | | | 396/428 |
| 9,046,743 B2 | * | 6/2015 | Koymen | F16M 11/18 |
| 9,243,737 B2 | * | 1/2016 | Hida | F16M 11/04 |
| 9,753,358 B1 | * | 9/2017 | Hsin | F16M 11/425 |
| 10,228,608 B2 | * | 3/2019 | Wood | F16M 11/045 |
| 2012/0263445 A1 | * | 10/2012 | Beasley | F16M 11/2064 |
| | | | | 396/12 |
| 2014/0076192 A1 | * | 3/2014 | Hurd | F16M 11/045 |
| | | | | 104/165 |
| 2015/0234258 A1 | * | 8/2015 | Hida | G03B 17/561 |
| | | | | 396/428 |

FOREIGN PATENT DOCUMENTS

| CA | 2437148 A1 | 2/2008 |
| CN | 101625055 A | 1/2010 |
| CN | 202649654 U | 1/2013 |
| CN | 106352206 A | 1/2017 |
| CN | 106594489 A | 4/2017 |
| CN | 106641629 A | 5/2017 |
| DE | 4202825 A1 | 8/1993 |
| TW | 201533368 A | 9/2015 |

* cited by examiner

*Primary Examiner* — Clayton E. LaBalle
*Assistant Examiner* — Dennis Hancock
(74) *Attorney, Agent, or Firm* — Peter V. Schroeder; Booth Albanesi Schroeder PLLC (57) ABSTRACT

A track system, including at least one flat base with at least one cavity, at least one sliding path, at least one bolt, and at least one track nut. An end of a bolt is threadedly connected to an electronic device fixing apparatus, or a camera, or other accessory. At least one cavity is disposed on the flat base, and both sides of the flat base are provided with a side wall which functions as the slide path. The track nut is provided with a cavity, such as an internally threaded hole, and two sides of the track nut slide along the side walls.

14 Claims, 12 Drawing Sheets

TRACK SYSTEM

TECHNICAL FIELD

The present disclosure relates to a track system, and in particular, to a track system for mounting and connecting photo/video accessories and portable camera devices.

BACKGROUND

The quality of a photo and video content depends on large number of factors to be controlled. To have the better quality of still pictures and video footage that is to be filmed on a camera, an operator should utilize a number of accessories to amend the current environmental conditions in order to create the seeking appearance of the shooting objects. The first in a row of such accessories to help with the process will be external lightning devices like lamps with or without light filters, barndoors to direct light beams, and/or other lightening accessories. And it is often necessary to have several lighting sources in a line with each other or in a particular angle connected to the camera. It is also a subject in a video shooting that often is required to use an external microphone in order to increase the clarity of capturing sound and/or having it synchronized with the current video for broadcasting or live streaming. This microphone normally is connected to the camera the way keeping it out of the field of view. For some other shots it is also important to have the camera with the said accessories connected to a still or movable basement for a stabilization to prevent unwanted image shaking and/or to deliver a smooth move of the camera. In many cases the camera needs also to move together with lights and microphone to follow the shooting object. In some cases an operator will need to shoot with two or more cameras simultaneously to capture the same scene with different frame fillings or different field of view. The present disclosure enhances and improves the usage of such accessories and extensions like photography and videography equipment upon conventional means of mounting, connecting, and adjusting their positions against the camera and each other while being very lightweight itself but durable and sturdy with the ability to bear heavy weights.

Nowadays, there are two standard connection means, which normally in use for attaching photo/video accessories to camera apparatus and connecting such apparatus to different supports like a tripod, for instance. The first of the said standards is ¼" thread, which many cameras have in a form of an inner nut. This thread is to be used to connect such camera or device on a standard tripod or any other supporting devise that features such ¼" size standard tightening bolt.

The second standard connection port is so called cold or hot shoe mounting system, which many of cameras have as well. The majority of portable external light apparatus are coming with a connection member that fits in the cold shoe port on a camera to be fixed firmly in it. There are also available a plurality of connectors to enable mounting of different accessories with corresponding connection member fitting a standard cold shoe port. However, they have different length of the connection leg platform while the width of said platform is the same according to the standard size of the shoe port. It is also important that such connection mean can be fixed and provides a non-movable connection if tighten with a clamp nut to a cold shoe port.

The said shoe port is normally to be used on a camera for connecting external light or a microphone with the mechanical solution. Most of accessories with such shoe fitting member also have the said integrated ¼" nut to enable more connectivity options.

There are numerous adaptors and mounting devices for photo/video accessories. While these devices may be suitable for the particular purpose, like mounting one flashing light or multiplying the number of shoe ports to have more accessories but usually no more than one item per one shoe port, they may not be as suitable for the accommodation of plurality of devices by different means in a different order at the same time along with several cameras. Therefore, there is a need for a connection, accommodation, and/or mounting system which is both lightweight and durable, and provides fixed and movable connectivity options.

SUMMARY

The present disclosure relates generally to a connection, accommodation, and mounting of photo/video equipment and accessories together with or without cameras or other devices with integrated photo/video cameras to a fixed and/or movable, support base.

According to several aspects, the present disclosure provides a mounting track system for photo/video cameras and accessories that allows the user to mount various types of photography equipment and accessories to the system in several ways, to adjust their position, fixing them or keep movable, along the track, and to connect further all mounted items to a basement or/and other mounts and extensions.

DESCRIPTION OF EMBODIMENTS

The concept, specific structure and produced technical effects of the present disclosure are clearly and completely described below with reference to the schematic diagrams, to facilitate full understanding of the objectives, features and effects of the present disclosure. Apparently, the described embodiments are only some embodiments of the present disclosure, rather than all the embodiments. All other embodiments obtained by those skilled in the art based on the embodiments of the present disclosure without creative efforts fall within the protection scope of the present disclosure.

The present disclosure Mounting and Connection track System has been created to accommodate and carry photo and video accessories, to which different compact cameras also can be attached along with various types of photography equipment and accessories, all of Which together can be mounted on one or several of standard photo/video supports or basements thanks to the original system construction. The present disclosure provides easy and convenient way of connection to any of standard tripods, dollies, cars, and other movable supports for photo/video equipment. The System also can be connected to one or more handles for a convenient hand grip. The said wide choice of connectivity options and abilities allow the present disclosure to be used with or without a camera, with any photo/video equipment and accessories attached. Such accessories could be positioned according to the user's needs in order to benefit from using a plurality of them to manipulate shooting environment more effectively and set up camera position along with connected parts to stand still or to be moved synchronically in any direction.

Embodiment 1

Figure 1:
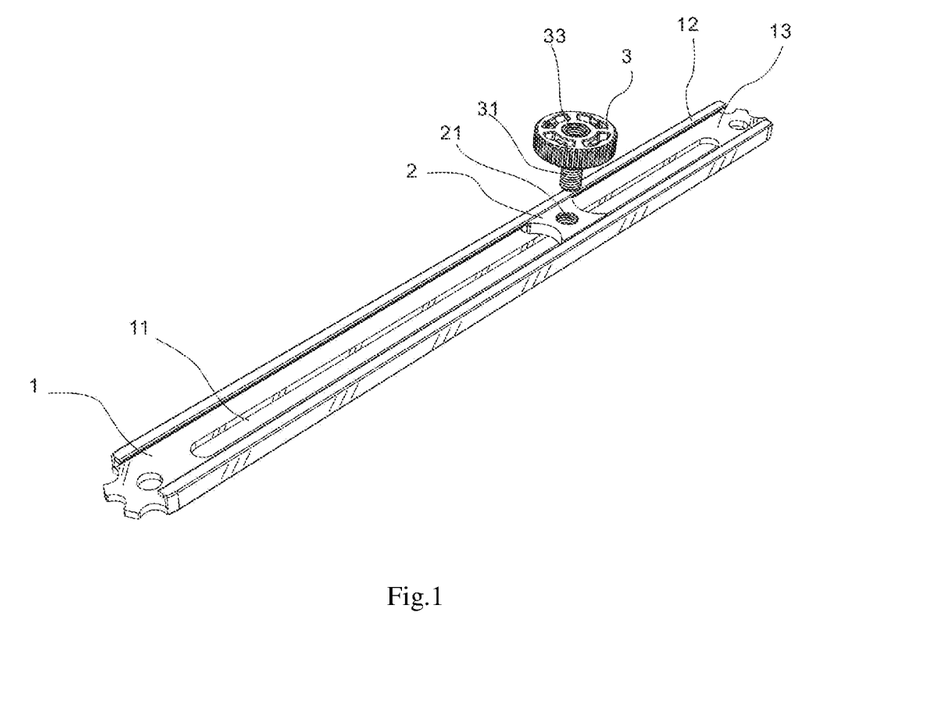
FIG. 1 is a schematic structural diagram of Embodiment 1 of the present disclosure.

FIG. 1 illustrates a mounting and connection track system, which comprises a track in a form of extended c-shaped bracket, the bracket comprises a flat base 1 on or as a bottom of the bracket, at least one cavity 11, and two L-shaped walls 12 along both sides of the flat base 1. The cavity 11 is disposed along part or full length of the flat base 1. The cavity 11 can be located in the middle, in a widthwise direction of the flat base 1.

Figure 8:
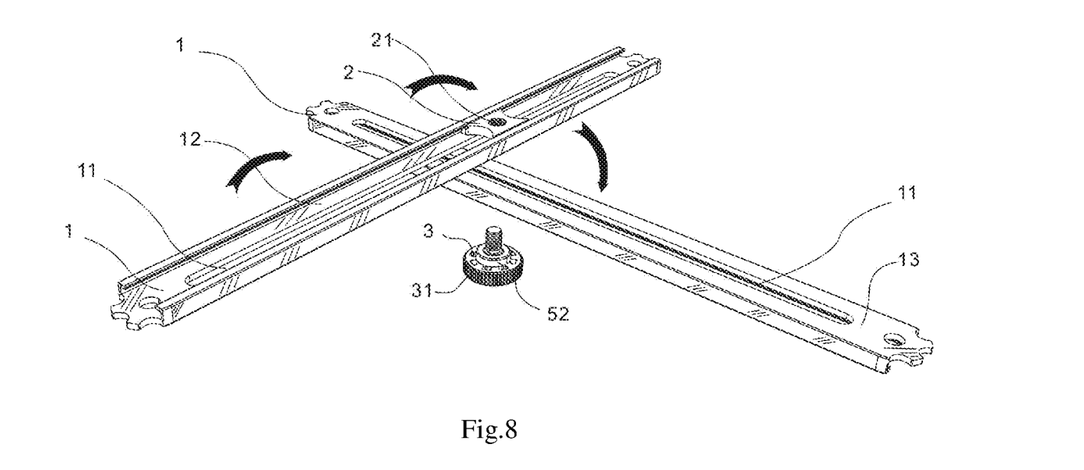
Figure 9:
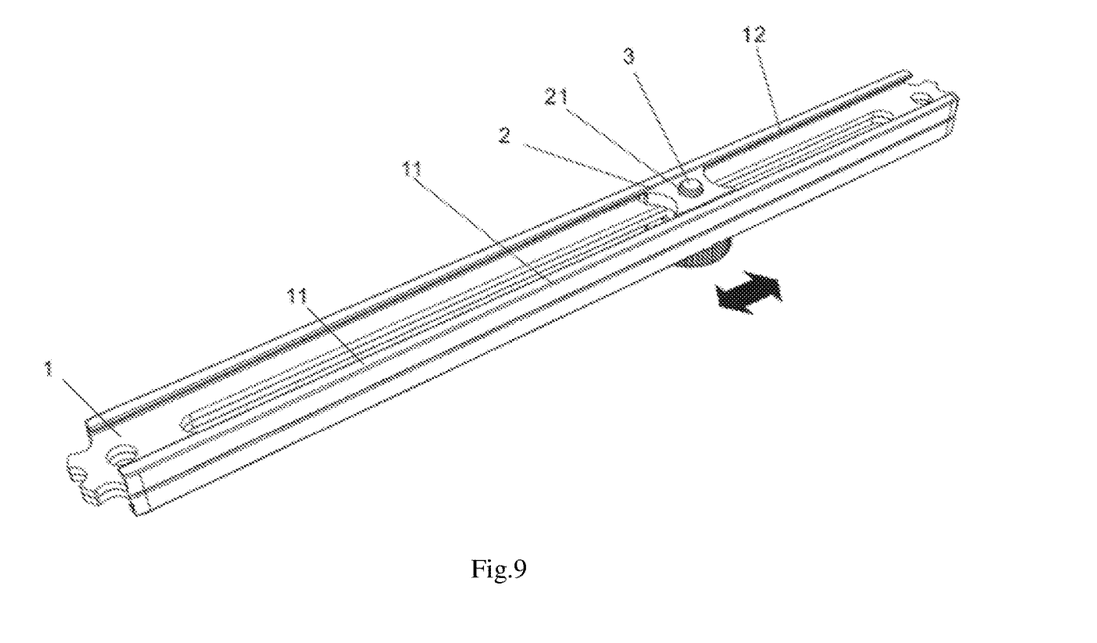
FIG. 9 is a schematic structural diagram of Embodiment 6 of the present disclosure.

A plurality of accessories, which feature connection means suitable to fit a usual cold shoe port, could be connected to the track by inserting a shoe connection member in the track from either end of the bracket the same way as they supposed to be connected to a standard cold shoe port. Specifically, the track nut 2 can be formed and operable as a sliding block (also shown in FIG. 8a). The bolt 3 can be formed as a flat-head bolt.

The track nut 2 features a cavity 21 with a thread of ¼" size or other suitable sizes. The track nut 2 is bounded by the flat base 1 on the bottom and L-shaped side walls 12 on the sides and a top of the track nut 2 itself. The track nut 2 can move horizontally along the track. The inner track nut 2 matches the inner track sizes as shown and can be shaped to be flush with the top of the side walls, to form an even surface if lifted to an upper position in usage.

The bolt 3 comprises a top round plate with a plurality of notches on side for easier tightening and releasing by hands, a lower skirt, which diameter is less than distance between side walls 12, i.e. a gap between the top sections of the side walls 12, but greater than the cavity 11 width, and has the same size ¼" to match the cavity 21. As the best shown in FIG. 1 and FIG. 2, the bolt 3 can be screwed in the track nut 2 either from the top side of the track or from the bottom side of the track through Cavity 11.

In use, any camera can be connected to the track with a bolt through the cavity or with a holder, and an accessory can be connected to the track directly using a standard cold shoe mount.

In use, an end of the bolt 3 can be threadedly connected to an electronic device clamping apparatus. The sidewall 12 is in a L-shaped structure. A top of the sidewall 12 is connected to the flat base 1 via a wall section approximately orthogonal with the flat base 1, such that a guide rail or an inner groove is formed in each side of the track. Two sides of the track nut can fit into the inner grooves in a sliding manner. After the track nut 2 is fixed to the flat base 1, the electronic device clamping apparatus can be threadedly connected and fixed to one end of the bolt, since the electronic device clamping apparatus is provided with a screw hole matching the bolt. When a position of the track nut needs to be adjusted, the bolt may be unscrewed so that the track nut slides on the inner groove of the track. The track nut is fixed again after a desired position is selected.

Embodiment 2

Figure 2:
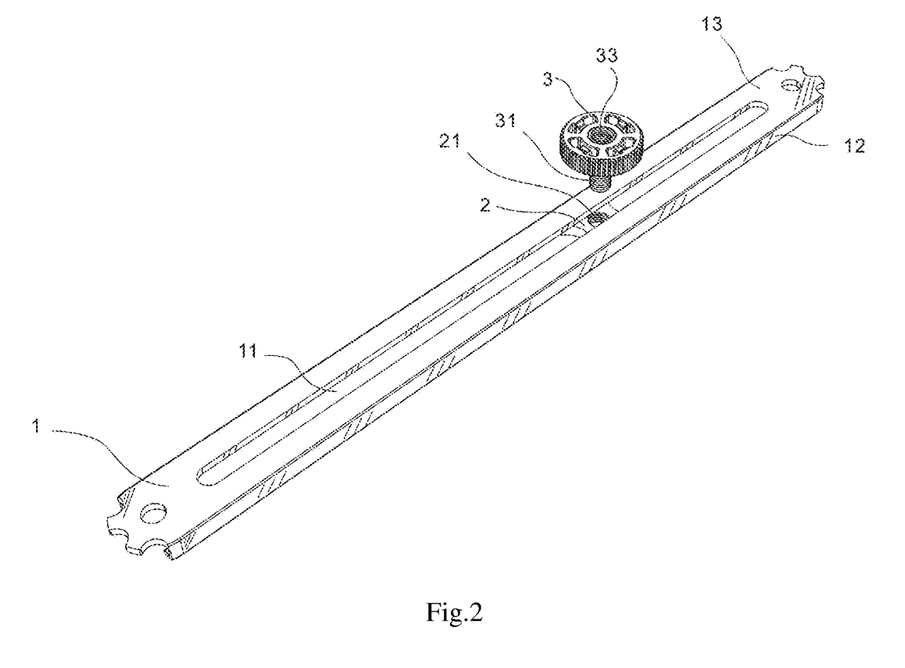
FIG. 2 is a schematic structural diagram of Embodiment 2 of the present disclosure.

As shown in FIG. 2, this embodiment differs from Embodiment 1 in that the bolt 3 is screwed into the track nut 2 via the cavity 11, from a bottom side of the bracket.

Embodiment 3

Figure 3:
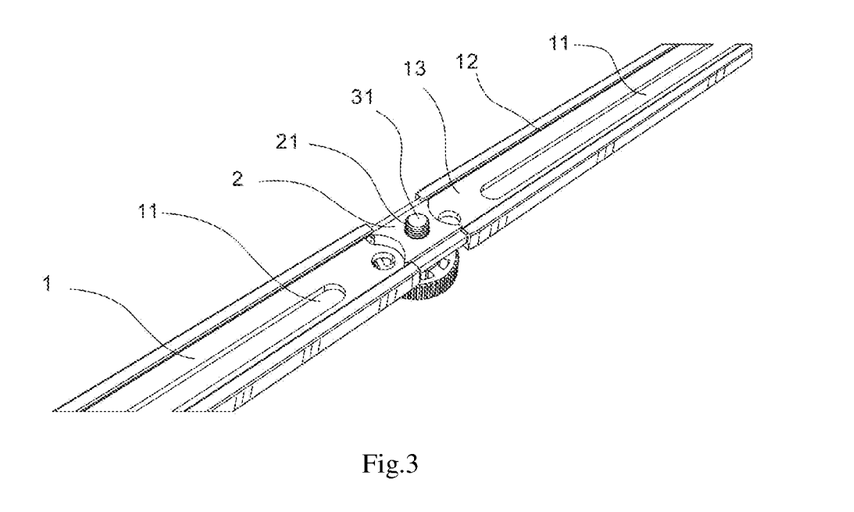
FIG. 3 is a schematic structural diagram of Embodiment 3 of the present disclosure.

As shown in FIG. 3, two ends of two flat bases 1 are connected by using an track nut 2 and are fixed together by using a bolt 3. In this way, lengths of the flat bases are extended, and the two flat bases may be selected from any of the flat bases disclosed in Embodiment 1 and Embodiment 2. Certainly, more flat bases can be connected in the same connection manner on the basis of the two connected flat bases.

Embodiment 4

Figure 4:
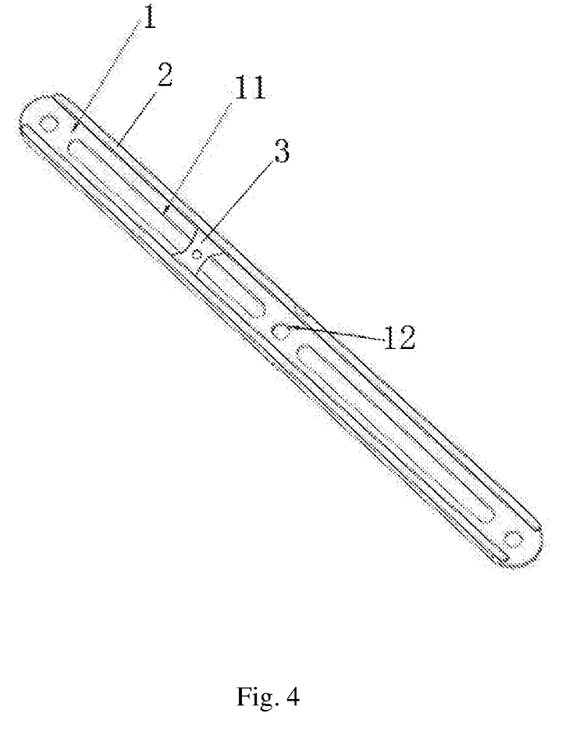
FIG. 4 is a schematic structural diagram of Embodiment 4 of the present disclosure.

As shown in FIG. 4, this embodiment differs from Embodiment 1 in that a flat base 1 is provided with two through slot 11 and at least one through hole 12 in between. Optionally, the ends of the track are rounded. Other structures of the flat base are the same as those in Embodiment 1 and 2. Optionally, three or more through slot or cavity 11 can be provided.

Embodiment 5

Figure 5:
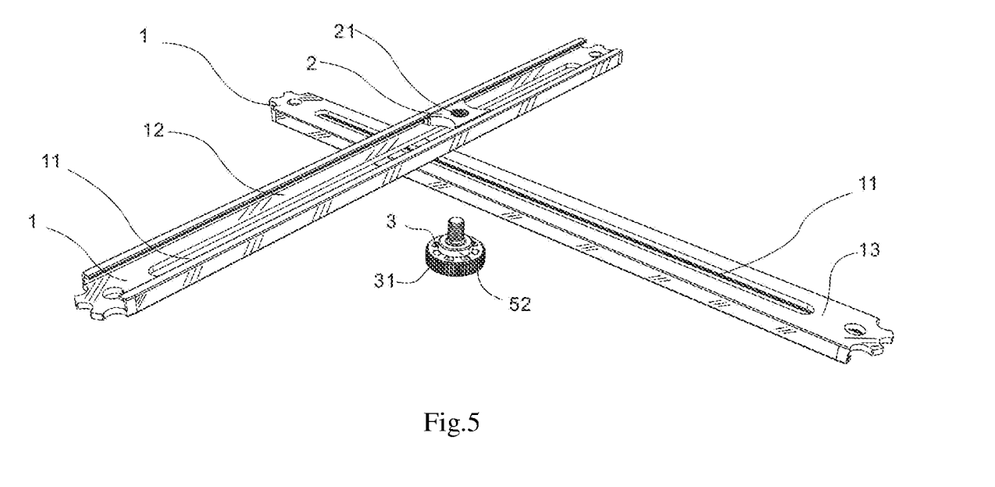
FIGS. 5-8 are schematic structural diagrams of Embodiment 5 of the present disclosure.
Figure 6:
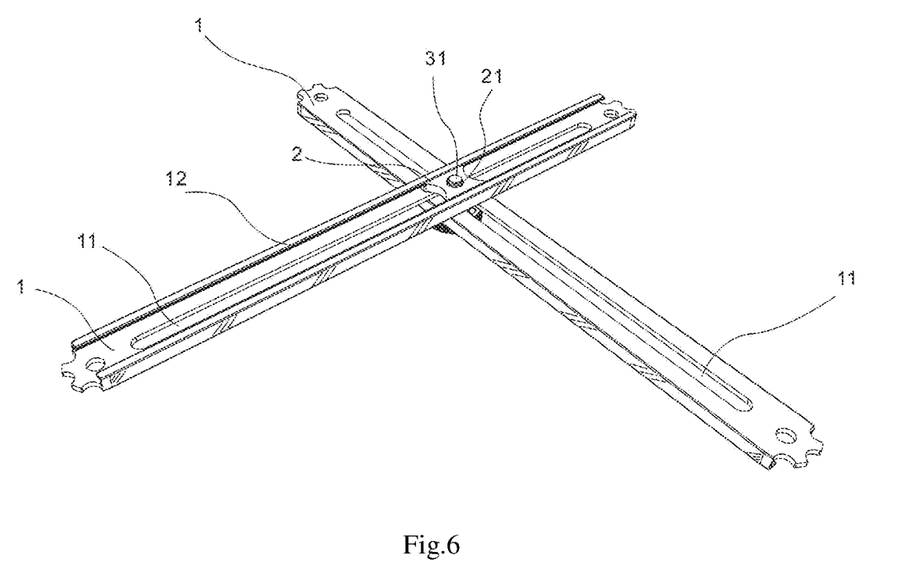

As shown in FIG. 5-6, the bolt 3 can connect and fix two flat bases 1 together in a cross manner (or other desired angle) by using one track nut 2. The position of the track nut 2 can be adjusted and fixed by loosing and tightening the bolt 3, such that the combination of two angled tracks can provide a flexibility of connecting different devices. The bottom sides of the two flat bases 1 can be contacted with each other.

Embodiment 6

Figure 7:
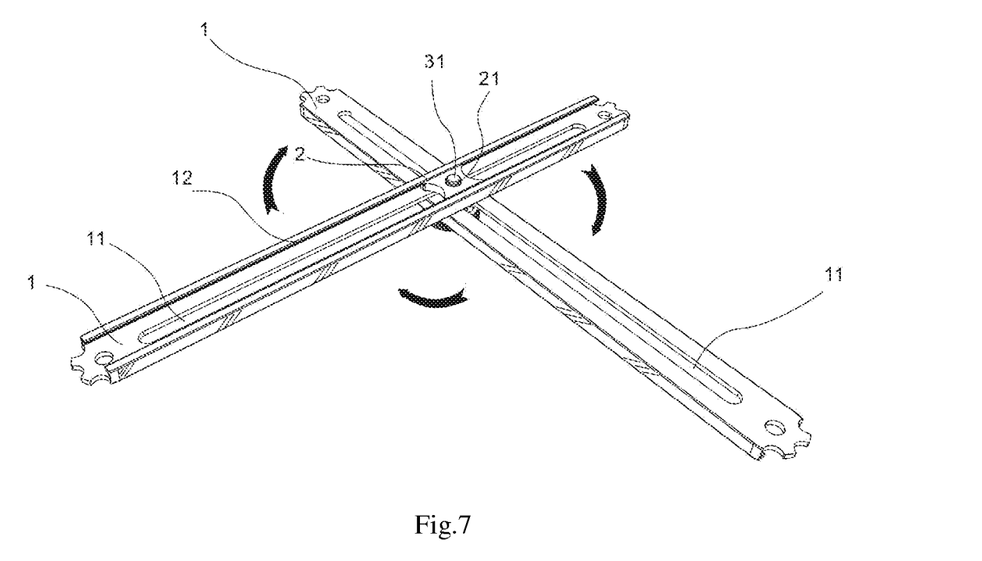

As shown in FIG. 7, as similar to Embodiment 5, when the two flat bases 1 are aligning completely, the combination of two tracks actually provides a double sides guide rail track.

Figure 10:
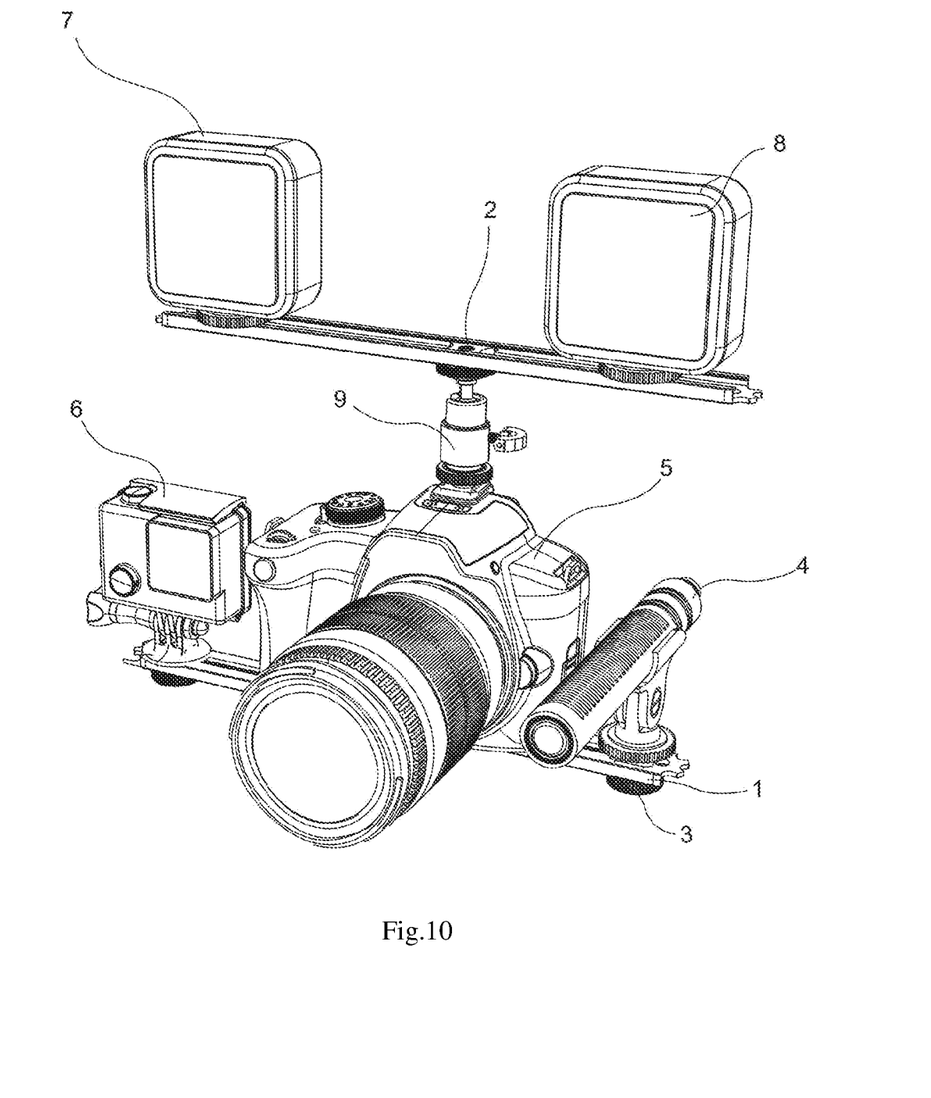
FIG. 10 is a schematic structural diagram of an installation of Embodiment 1 and 2 of the present disclosure.

FIG. 10 shows an exemplary installation of Embodiment 1 and 2 of the present disclosure. A camera 5, a first accessory 4, a second accessory 6 can be fixed on a track according the embodiment 1 by the bolts 3, which directly screwed into screw holes on the camera 5 and accessories 4, 6, via the cavity 11. Additionally, an another track according to embodiment 2 is installed on the shoe port of the camera 5 via a mounting rod 9, wherein the bolts is screwed into the cavity 21 of the track nut 2 from the bottom of the track, such that the bolt 3 and track nut 2 are fixed in position on the track. Flash light units 7, 8 can be installed on either or both end of the track, by threading with other track nuts.

However, some devices with an extended length of a connecting member may not fit the track because the actual position of the track is 90° degree to a normal cold shoe orientation if it is placed on top of a camera. Thus the length of a leg connection member becomes the width in this position. In such a case the device with the long connection member can be fixed on the track with the bolt 3 screwing in an integrated nut on the device connection member. Due to the bolt 3 construction the connected item can be fixed with the bolt from either side of the track through the cavity.

This way of connection presumes the ability to fix an accessory item on the track on any position by rotation it 360° around the bolt rod. This function is useful for positioning a lightening source in an angle to the shooting object as well as for using two microphones pointing two different directions.

The same way a camera can be connected to the track through cavity 11 with the bolt 3. If a camera has no ¼" nut it normally comes with an adaptor for ¼" thread connection, which can be used to mount it in the track.

Embodiment 7

Figure 11A:
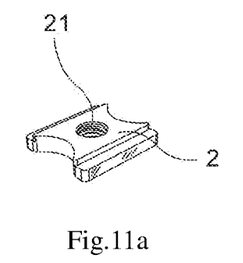
FIGS. 11a-11c are schematic structural diagrams of Embodiment 7 of the present disclosure.
Figure 11B:
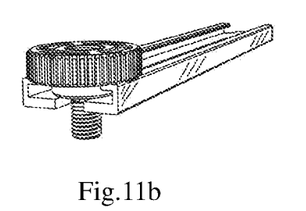
Figure 11C:
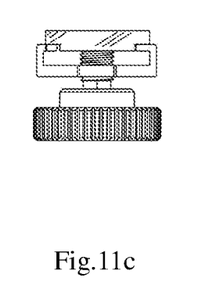

As shown in FIG. 11a-11c, the track nut 2 can be used to enable the connection to mount the track on a tripod or another supportive device with ¼" stud bolt. The track nut 2 matches the inner groove formed on the side walls 12 of the track and is able to move inside it freely if is not fixed with the bolt 3 or any other ¼" bold connector.

FIG. 11a shows a possible construction of the track nut 2, which can be accommodated in the C-shaped bracket formed by the flat base 1 and side walls 12. Specifically, a portion with reduced thickness on each side of the track nut 2 can be accommodated in the L-shaped side wall.

FIG. 11b shows a track system without the track nut 2, wherein the screw 31 of the bolt 3 pass through the cavity 11 of the flat base 1 from a top of the flat base 1, enabling a firm connection with another bolt, or with a photo or video equipment.

FIG. 11c shows an alternative construction and arrangement of the track nut 2 on the track, wherein a position of the track nut 2 can be adjusted and fixed on the track, i.e. wherein a portion with reduced thickness on each side of the track nut 2 can be guided on the top sections of the side walls, wherein the bolt 3 is screwable on the track nut 2 from a bottom of the flat base 1, passing through the cavity 11, such that the track system will be fixed and stable.

Embodiment 8

Figure 12A:
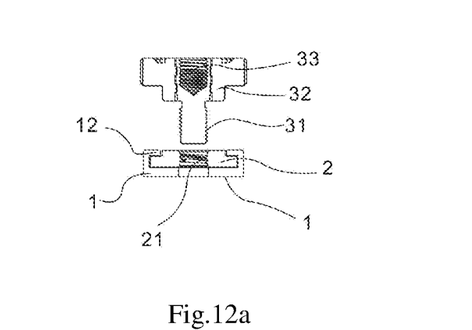
FIGS. 12a-12b are schematic structural diagrams of Embodiment 8 of the present disclosure.
Figure 12B:
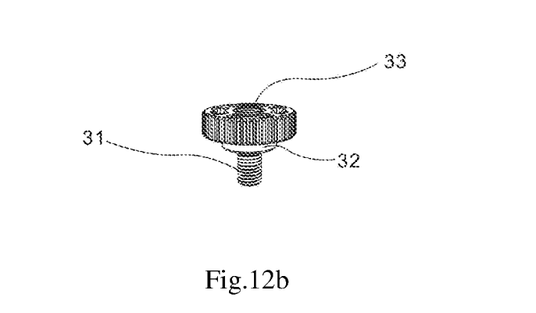

As shown in FIG. 12a-12b, the bolt 3 has a skirt part 32 between the head 33 and screw 31 of the bolt 3. The diameter of the skirt 32 is smaller than the gap between the top sections of the side walls 12 of the track but greater than width of the cavity 11. Thus, if the bolt 3 is screwed on the track nut 2 from the top of the track 1, with the screw 31 passing through the cavity 21 of the track nut 2, and/or passing through the cavity 11 of the flat base, it enables a firm connection to the track nut, which is still movable along the track. Other accessories can be connected to the ¼" top nut screw 33 in such case to benefit from such movability along the track. However, if the track nut 2 is tightening from bottom side of the track, i.e. if the bolt 3 is screwed on the track nut 2 from the bottom of the flat base 1, the whole track system will be fixed and stable, since the flat base 1 is now in between the track nut 2 and the bolt 3, and fixed by the tightening of the bolt 3 to the track nut 2.

However, the bolt 3 can be constructed without the skirt part 32.

Optionally, the diameter of the head or top round plate 33 can be smaller than the gap between the top sections of the side walls 12 of the track but greater than width of the cavity 11.

Optionally, the diameter of the head or top round plate 33 can be at least greater than the gap between the top sections of the side walls 12.

According to the present disclosure, with reference to FIGS. 1-12b, track systems for mounting and connecting photo and video equipments are provided.

According to several aspects of the present disclosure, a track system comprising:

at least one flat base having at least one cavity;

a slide path along a part or full length and each side of the flat base; and at least one bolt engageable with the flat base to mount and connect a photo or video equipment to the track system.

According to several aspects of the present disclosure, wherein the cavity of the flat base is formed as an elongate slot along the length of the flat base.

According to several aspects of the present disclosure, wherein the slide path comprises a L-shaped side wall which comprises a wall section connected to and substantially orthogonal with the flat base, a top section connected to the wall section and substantially parallel with the flat base.

According to several aspects of the present disclosure, wherein the flat base and L-shaped side walls on both sides of the flat base together form a substantially C-shaped bracket.

According to several aspects of the present disclosure, wherein the at least one bolt comprises: a top round plate with a plurality of notches on side, and a screw with external threading, wherein the diameter of the top round plate is greater than a gap between the top sections of the side walls.

According to several aspects of the present disclosure, wherein the at least one bolt comprises: a lower skirt between the top round plate and the screw, wherein the diameter of the lower skirt of the bolt is smaller than a gap between the top sections of the side walls but greater than a width of the cavity of the flat base.

According to several aspects of the present disclosure, wherein the bolt comprises a screw on the top round plate to fix an accessory for photo or video, or to another bolt.

According to several aspects of the present disclosure, wherein the track system comprises at least one track nut having a hole with an internal thread of certain size to fix an accessory for photo or video, or a screw of the bolt, wherein the track nut is hounded by the flat base and the L-shaped side walls;

wherein a portion with reduced thickness on each side of the track nut is accommodated in the L-shaped side wall, or is guided on the top sections of the side walls, such that the track nut is slidably movable and positional adjustable along the L-shaped side walls.

According to several aspects of the present disclosure, wherein the screw of the bolt pass through the cavity of the flat base from a top of the flat base or from a bottom of the flat base, enabling a firm connection with another bolt, or with a photo or video equipment.

According to several aspects of the present disclosure, wherein the bolt is screwable on the track nut from a top of the flat base, enabling a firm connection to the track nut which is still movable along the flat base.

According to several aspects of the present disclosure, wherein the bolt is screwable on the track nut from a bottom of the flat base, such that the track system will be fixed and stable.

According to several aspects of the present disclosure, wherein the track system comprises: two or more C-shaped brackets.

According to several aspects of the present disclosure, wherein the track system comprises two or more C-shaped brackets, wherein either or both end of the flat base is provided with a projection horizontally extended from the flat base, wherein the projection is provided with a half of a through hole, such that corresponding ends of two flat bases are connected by using the track nut and are fixed together by using the bolt.

According to several aspects of the present disclosure, wherein the track system comprises two or more C-shaped brackets stacked one another, wherein every two C-shaped brackets are connected and fixed together in a cross manner and in an angle by using two bolts screwable one another.

According to several aspects of the present disclosure, wherein the track system comprises two or more C-shaped brackets stacked one another, wherein every two C-shaped brackets are connected and fixed together in a cross manner and in an angle by using the bolt and the track nut.

According to several aspects the present disclosure, a track system comprises at least one bolt, wherein an end of the bolt is threadedly connected to an electronic device fixing apparatus, multiple through holes and/or through slots are disposed on the flat base, both sides of the flat base are provided with a slide path, two sides of the track nut slide along the slide paths, and when the bolt passes through the cavity of the track nut and is fastened into the cavity, a head of the bolt is fixed to the slide paths, thereby fixing the track nut to the slide paths.

According to several aspects the present disclosure, wherein both sides of the flat base are provided with a sidewall in the same direction, the two sidewalls are in a convex structure, convex tops of the convex sidewalls are connected to the flat base, the two sidewalls form slide paths having an inner groove after being connected to the flat base, and the two sides of the track nut fit into the inner grooves of the slide paths in a sliding manner.

According to several aspects the present disclosure, wherein a diameter of the head of the bolt is greater than a spacing between the two sidewalls of the flat base.

The present disclosure has the following beneficial effects: A position of the track nut can be freely adjusted by sliding the track nut on the slide paths (the inner groove or guide rail) of the flat base, and then the track nut whose position is properly adjusted is fixed by using the bolt so that the bolt with the electronic device clamping apparatus threadedly connected to the end thereof is fixed to the flat base, thereby facilitating the fixing of the electronic device clamping apparatus and convenient use and disassembly.

It should be noted that the foregoing descriptions are only several embodiments of the present disclosure, the present disclosure is not limited to the foregoing embodiments, and all embodiments that achieve the technical effects of the present disclosure with the same means shall fall within the protection scope of the present disclosure.

What is claimed is:

1. A track system for mounting and connecting a photo or video equipment, comprising:
   a track having a length and a flat base, the flat base having at least one through slot extending generally the length of the track;
   the track having two opposing wall sections connected to opposing sides of the flat base;
   the track having two spaced apart top sections extending from the opposing wall sections and substantially parallel with the flat base, wherein a distance between the wall sections is greater than a distance between the top sections;
   at least one bolt extending through the through slot and engageable with the flat base to mount and connect a photo or video equipment to the track system,
   the bolt connectable to a track nut positioned on the track system between the opposing wall sections.

2. The track system of claim 1, wherein the through slot of the flat base is formed as an elongate slot along the length of the flat base, and the length of the flat base is greater than the length of the through slot.

3. The track system of claim 1, wherein the flat base, wall sections and top sections together form a substantially C-shaped bracket.

4. The track system of claim 3, wherein the track system track nut has a hole with an internal thread of certain size to fix an accessory for photo or video, or a screw of the bolt, wherein the track nut is bounded by the flat base, the wall sections and the top sections;
   wherein each side of the track nut is accommodated in the wall sections, or is guided on the top sections of the side walls, such that the track nut is slidably movable and positional adjustable along the wall sections.

5. The track system of claim 4, wherein the bolt is screwable onto the track nut from above the flat base, enabling a firm connection to the track nut which is still movable along the flat base.

6. The track system of claim 4, wherein the bolt is screwable onto the track nut from below the flat base such that the track nut will be fixed and stable.

7. The track system of claim 4, wherein the track system comprises a plurality of C-shaped brackets, wherein each of the C-shaped brackets has at least one either or both end of its flat base provided with a projection horizontally extending therefrom, wherein the projection is provided with a through hole, such that the ends of two flat bases are connectable by using the track nut and are fixed together by using the bolt to extend through the through holes of the C-shaped brackets and into the track nut.

8. The track system of claim 4, wherein the track system comprises two or more C-shaped brackets stacked on one another, wherein the C-shaped brackets are connected and fixed together at an angle to one another using the bolt and the track nut.

9. The track system of claim 1, wherein the at least one bolt comprises: a top round plate with a plurality of notches on a side of the top round plate, and a screw with external threading, wherein the diameter of the top round plate is greater than the distance between the top sections.

10. The track system of claim 9, wherein the at least one bolt comprises: a lower skirt between the top round plate and the screw, wherein the diameter of the lower skirt of the bolt is smaller than a gap between the top sections of the side walls but greater than a width of the through slot of the flat base.

11. The track system of claim 9, wherein the bolt comprises a screw on the top round plate to fix an accessory for photo or video, or to another bolt.

12. The track system of claim 11, wherein the screw of the bolt pass through the through slot of the flat base from a top of the flat base or from a bottom of the flat base, enabling a firm connection with another bolt, or with a photo or video equipment.

13. The track system of claim 11, wherein the track system comprises two or more C-shaped brackets stacked on one another, wherein the stacked C-shaped brackets are connected and fixed together at an angle to one another using a bolt extending through the through slots of the C-shaped brackets.

14. The track system of claim 1, wherein the track system comprises: two or more C-shaped brackets.

\* \* \* \* \*